(12) United States Patent
Gorthi et al.

(10) Patent No.: US 8,161,459 B2
(45) Date of Patent: Apr. 17, 2012

(54) METHOD AND SYSTEM FOR GENERATING FUNCTIONAL TEST CASES

(75) Inventors: Ravi Prakash Gorthi, Bangalore (IN); Kailash Kumar Prasad Chanduka, Bangalore (IN); Anjaneyulu Pasala, Bangalore (IN)

(73) Assignee: Infosys Technologies Limited (IN)

(*) Notice: Subject to any disclaimer, the term of this patent is extended or adjusted under 35 U.S.C. 154(b) by 734 days.

(21) Appl. No.: 12/321,133

(22) Filed: Jan. 15, 2009

(65) Prior Publication Data
US 2010/0180256 A1 Jul. 15, 2010

(51) Int. Cl.
*G06F 9/44* (2006.01)

(52) U.S. Cl. ........ 717/124; 717/120; 717/127; 717/104; 709/204

(58) Field of Classification Search .......... 717/120, 717/124, 127, 104; 707/204
See application file for complete search history.

(56) References Cited

U.S. PATENT DOCUMENTS

| | | | |
|---|---|---|---|
| 2002/0095660 A1* | 7/2002 | O'Brien et al. | 717/127 |
| 2004/0030421 A1* | 2/2004 | Haley | 700/49 |
| 2004/0268308 A1* | 12/2004 | Srivastava et al. | 717/120 |
| 2005/0216555 A1* | 9/2005 | English et al. | 709/204 |
| 2005/0229043 A1* | 10/2005 | Nasuti et al. | 714/38 |
| 2006/0075303 A1* | 4/2006 | Ulrich et al. | 714/38 |

* cited by examiner

*Primary Examiner* — Don Wong
*Assistant Examiner* — Lynda Dinh
(74) *Attorney, Agent, or Firm* — Lerner, David, Littenberg, Krumholz & Mentlik, LLP

(57) ABSTRACT

The present invention provides a method, system and computer program product for generating one or more functional test cases for testing a software application. One or more use-case activity diagrams are developed for the software application on the basis of a predefined set of rules. The consistency of the use-case activity diagrams is checked automatically. Further, the consistent use-case activity diagrams are validated with one or more users. Furthermore, the one or more functional test cases are generated automatically from the validated use-case activity diagrams.

18 Claims, 13 Drawing Sheets

602a

| Scenario / TestCases #1 | | | | | | |
|---|---|---|---|---|---|---|
| Criticality : | Low | | | | | |
| Preconditions: | | | | | | |
| Test Step(s) | | | | | | |
| Description Details | | Input | Conditions | Expected Output | Actual Output | Remarks |
| | #1 | Enter the card | Card inserted properly? = Yes | 1. Display a message to enter the PIN | | |
| | #2 | Enter the PIN | Valid PIN = Yes | 1. Display a message to continue with the transaction | | |
| | #3 | Enters the operation to be performed | | | | |
| | #4 | Presses to Change the PIN | fork = Change PIN | | | |
| This test case is synchronized with other test case | #5 | Enter the old PIN | Is PIN valid? = Yes | 1. Display a message to enter he new PIN | | |
| | #6 | Enter the new PIN | | 1. Display PIN is changed | | |

602b

| Scenario / TestCases #2 | | | | | | |
|---|---|---|---|---|---|---|
| Criticality : | Low | | | | | |
| Preconditions: | | | | | | |
| Test Step(s) | | | | | | |
| Description Details | | Input | Conditions | Expected Output | Actual Output | Remarks |
| | #1 | Enter the card | Card inserted properly? = Yes | 1. Display a message to enter the PIN | | |
| | #2 | Enter the PIN | Valid PIN = Yes | 1. Display a message to continue with the transaction | | |
| | #3 | Enters the operation to be performed | | | | |
| | #4 | Presses to Change the PIN | fork = Change PIN | | | |
| This test case is synchronized with other test case | #5 | Enter the old PIN | Is PIN valid? = No | 1. Display a message PIN is invalid | | |

FIG. 6(a)

Scenario #3

Scenario / TestCases #3
Criticality: Low
Preconditions:
Test Step(s)

| Description Details | | Input | Conditions | Expected Output | Actual Output | Remarks |
|---|---|---|---|---|---|---|
| | #1 | Enter the card | Card inserted properly? = Yes | 1. Display a message to enter the PIN | | |
| | #2 | Enter the PIN | Valid PIN = Yes | 1. Display a message to continue with the transaction | | |
| | #3 | Enters the operation to be performed | | | | |
| | #4 | Presses button to Withdraw cash | fork = Withdraw | | | |
| | #5 | Enter the amount | Cash available? = Yes | 1. Display a message to collect the cash | | |
| This test case is synchronized with other test case | | | | | | |

602c

Scenario / TestCases #4
Criticality: Low
Preconditions:
Test Step(s)

| Description Details | | Input | Conditions | Expected Output | Actual Output | Remarks |
|---|---|---|---|---|---|---|
| | #1 | Enter the card | Card inserted properly? = Yes | 1. Display a message to enter the PIN | | |
| | #2 | Enter the PIN | Valid PIN = Yes | 1. Display a message to continue with the transaction | | |
| | #3 | Enters the operation to be performed | | | | |
| | #4 | Presses button to Withdraw cash | fork = Withdraw | | | |
| | #5 | Enter the amount | Cash available? = NO | 1. Display a message Cash is not available and abort the transaction | | |
| This test case is synchronized with other test case | | | | | | |

| Scenario / TestCases #5 | | | | | | |
|---|---|---|---|---|---|---|
| Criticality : | Low | | | | | |
| Preconditions: | | | | | | |
| Test Step(s) | | | | | | |
| Description Details | | Input | | Conditions | Expected Output | Actual Output | Remarks |
| | #1 | Enter the card | | Card inserted properly? = Yes | 1. Display a message to enter the PIN | | |
| | #2 | Enter the PIN | | Valid PIN = NO | 1. Display a message to enter the correct PIN | | |

602f

| Scenario / TestCases #6 | | | | | | |
|---|---|---|---|---|---|---|
| Criticality : | Low | | | | | |
| Preconditions: | | | | | | |
| Test Step(s) | | | | | | |
| Description Details | | Input | | Conditions | Expected Output | Actual Output | Remarks |
| | #1 | Enter the card | | Card inserted properly? = NO | 1. Display a message to insert the card properly | | |

FIG. 6(c)

METHOD AND SYSTEM FOR GENERATING FUNCTIONAL TEST CASES

BACKGROUND OF THE INVENTION

The present invention relates to the field of testing software applications. More specifically, the invention relates to generating functional test cases for testing software applications.

The primary purpose for testing software applications is to identify defects, so that these defects or errors may be corrected. Typically, during the testing phase of a software development life cycle, a software application is tested to identify its ambiguities, incompleteness, and errors. The scope of testing the software application includes examination and execution of a software code in different environments and conditions. It also includes examining the quality aspects of the software code.

Software testing generally includes two critical phases—test planning and test execution. The test planning phase includes creation and maintenance of test cases, data, and scripts. A test case or a test scenario in software engineering generally includes a unique identifier, requirement references from design specifications, preconditions, events, a series of steps or actions to perform, input, output, expected results, and actual results. The test execution phase includes executing the software based on the test plans and test cases, and reporting any errors found to the development team. Thereafter, the development team rectifies the errors either in the design of the software application or in the software code.

Presently, the test execution phase has been significantly automated. Existing test automation frameworks aim at automating the test execution phase. However, the test planning phase is largely performed manually. In many Information Technology (IT) organizations, test cases, data, and scripts are created manually and maintained from Software Requirements Specifications (SRS). With the advancement in the software technology, the complexity of the software applications is increasing significantly, resulting in an increase in the number of test cases. Therefore, the test planning phase is effort intensive and prone to human errors. Further, the existing techniques used for automatic generation of test cases are used for testing embedded software and are not useful in the general application testing domain as the embedded software applications have a wide range of deployment architectures in comparison to the general software applications. Furthermore, the existing techniques generate test cases from unstructured Unified Modeling Language (UML) use-case activity diagrams or UML state diagrams.

In light of the discussion above, there is a need for a method, system and computer program product for automatically generating functional test cases for testing software applications. Further, the method should be computationally efficient.

BRIEF SUMMARY OF THE INVENTION

An object of the invention is to automatically generate functional test cases for testing a software application.

Another object of the invention is to structure use-case activity diagrams used for generating the functional test cases.

To achieve the objectives mentioned above, the invention provides a method, system and computer program product for generating one or more functional test cases used for testing a software application. A Software Requirements Specifications (SRS) for the software application is analyzed for developing a plurality of use cases. The use cases thus developed are then analyzed for developing one or more use-case activity diagrams based on a predefined set of rules. A plurality of units of behavior is identified from the use cases and is then used for developing use-case activity diagrams. Each use-case activity diagram thus developed is an ordered sequence of a plurality of units of behavior. Further, consistency of each of the use-case activity diagrams is automatically checked. Based on the consistency check, the consistent use-case activity diagrams are validated with one or more users. Finally, one or more functional test cases are generated automatically from the validated use-case activity diagrams.

The method, system and computer program product described above have various advantages. The method provides a systematic approach for structuring use-case activity diagrams. The structured use-case activity diagrams are useful in automatic generation of functional test cases as well as other activities of a software development life cycle such as design of software applications, and so forth. The structured use-case activity diagrams also assist in identifying ambiguities and incompleteness of the SRS at an early stage of the software development life cycle. Additionally, the method provides a systematic approach for generation of functional test cases for system testing which further provides a complete coverage of test cases for identifying errors in software applications. Furthermore, the method provides a computationally efficient and simple method for creation and maintenance of functional test cases, thereby saving cost, time and effort.

BRIEF DESCRIPTION OF THE DRAWINGS

The various embodiments of the invention will hereinafter be described in conjunction with the appended drawings, provided to illustrate and not to limit the invention, wherein like designations denote like elements, and in which:

FIG. 6(a), 6(b) and 6(c) depict diagrammatical representations of functional test cases, in accordance with an exemplary embodiment of the invention;

DETAILED DESCRIPTION

The invention describes a method, system and computer program product for generating one or more functional test cases, also referred to as system test cases, used for testing a software application. One or more use-case activity diagrams are developed for the software application on the basis of a predefined set of rules. The consistency of the use-case activity diagrams is checked automatically, and the consistent use-case activity diagrams are validated with one or more users. Further, one or more functional test cases are automatically generated from the validated use-case activity diagrams.

Figure 1:
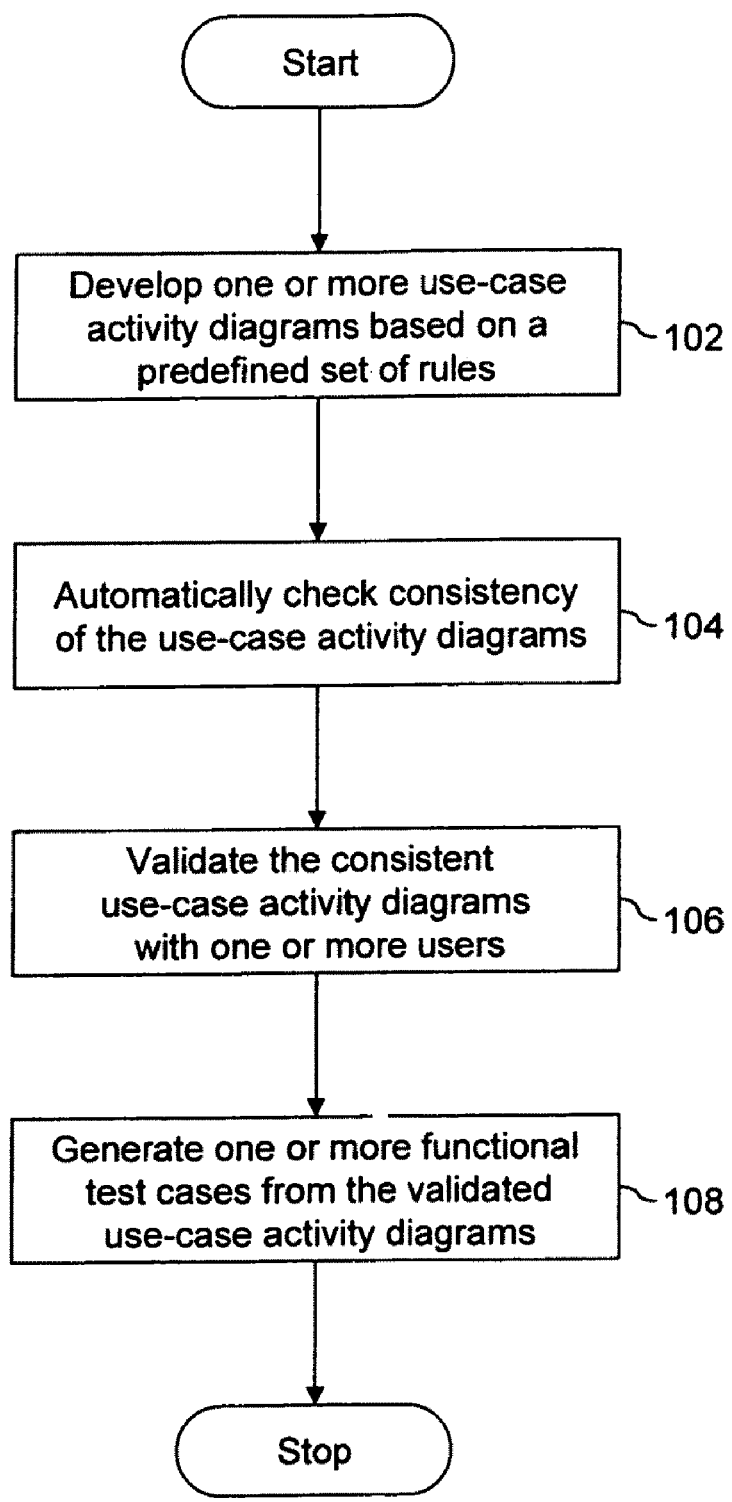
FIG. 1 is a flowchart of a method for developing functional test cases, in accordance with an embodiment of the invention.

FIG. 1 is a flowchart of a method for developing functional test cases, in accordance with an embodiment of the invention.

Figure 3:
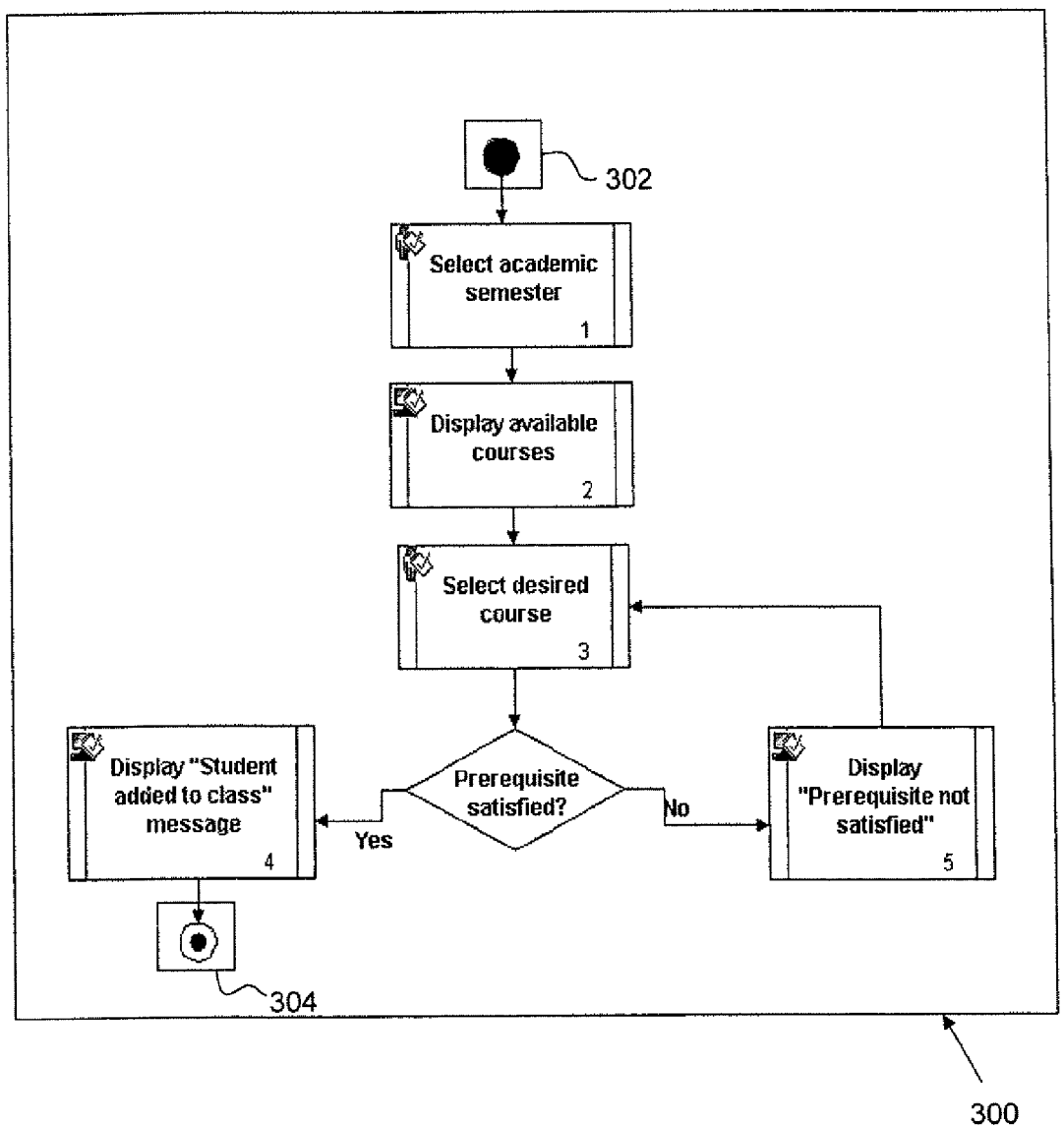
FIG. 3 is a snapshot depicting a use-case activity diagram, in accordance with an exemplary embodiment of the invention.
Figure 5A:
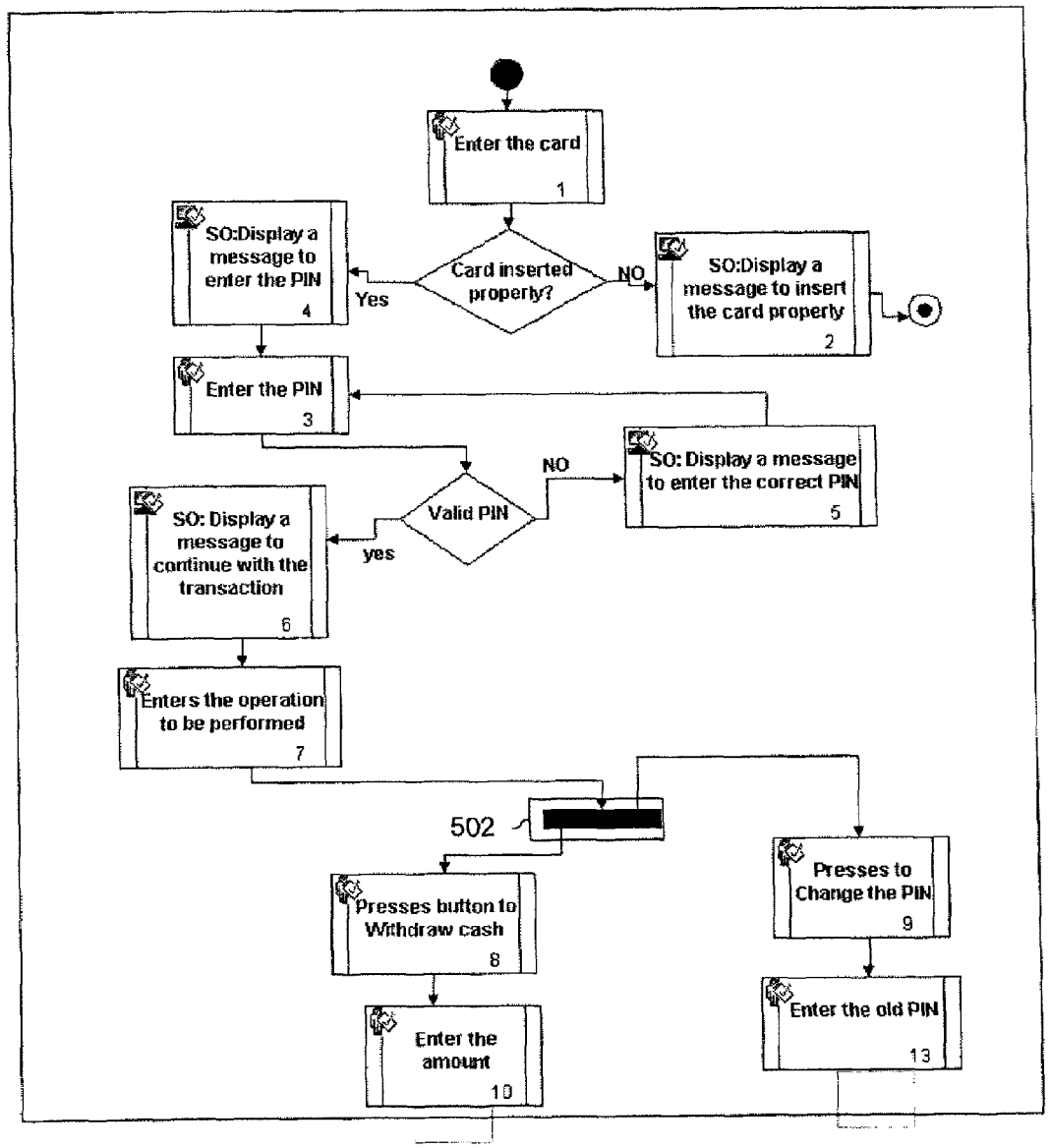
FIGS. 5(a) and 5(b) is a snapshot depicting a use-case activity diagram, in accordance with another exemplary embodiment of the invention.
Figure 5B:
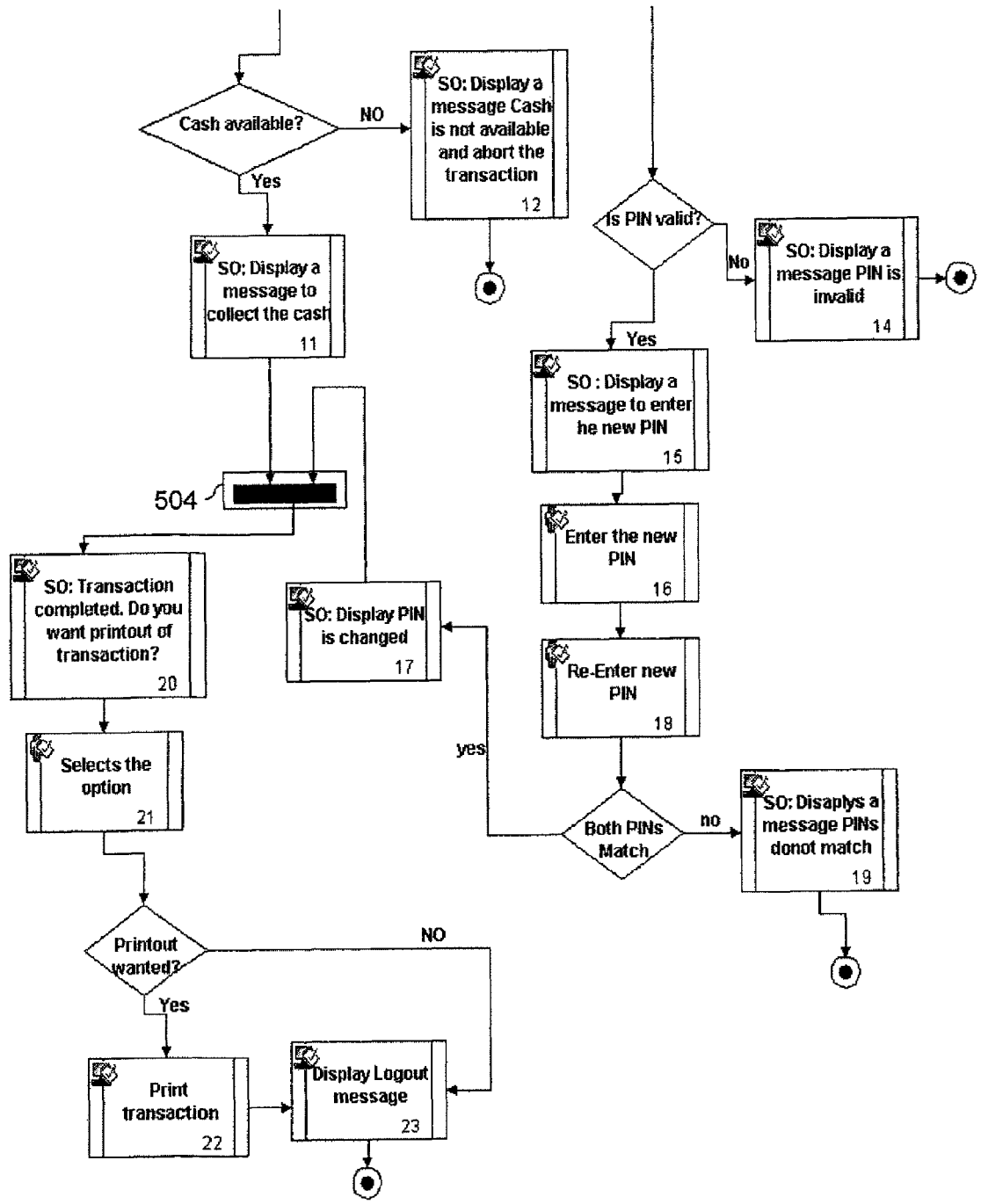

At step 102, one or more use-case activity diagrams for the software application are developed based on a predefined set of rules. A use-case activity diagram is a graphical representation of the expected behavior or functionality or use case scenario of the software application. The use-case activity diagram is an ordered sequence of activities modeling the functional behavior of the software application. In various embodiments of the invention, the use-case activity diagrams are defined in various modeling languages such as Unified Modeling Language (UML), Business Process Modeling (BPM) and so forth. The use-case activity diagram is represented as a cyclic directed graph containing a single start node and one or more ending nodes. Further, every path between any two nodes of a use-case activity diagram is a directed path. An exemplary snapshot of a use-case activity diagram is depicted in FIG. 3 and FIG. 5.

In an embodiment of the invention, the development of the use-case activity diagrams includes structuring of the use-case activity diagrams into an ordered sequence of units of behavior. Further, the predefined set of rules used for developing the use-case activity diagrams is based on decomposing or slicing of the behavior represented by the use-case activity diagrams. The behavior is sliced into the plurality of units of behavior. In an embodiment of the invention, the predefined set of rules is defined by a software developer. The development of the use-case activity diagrams based on the predefined set of rules is described in detail in conjunction with FIG. 2. In an embodiment of the invention, the use-case activity diagrams are developed by a software developer.

Figure 4:
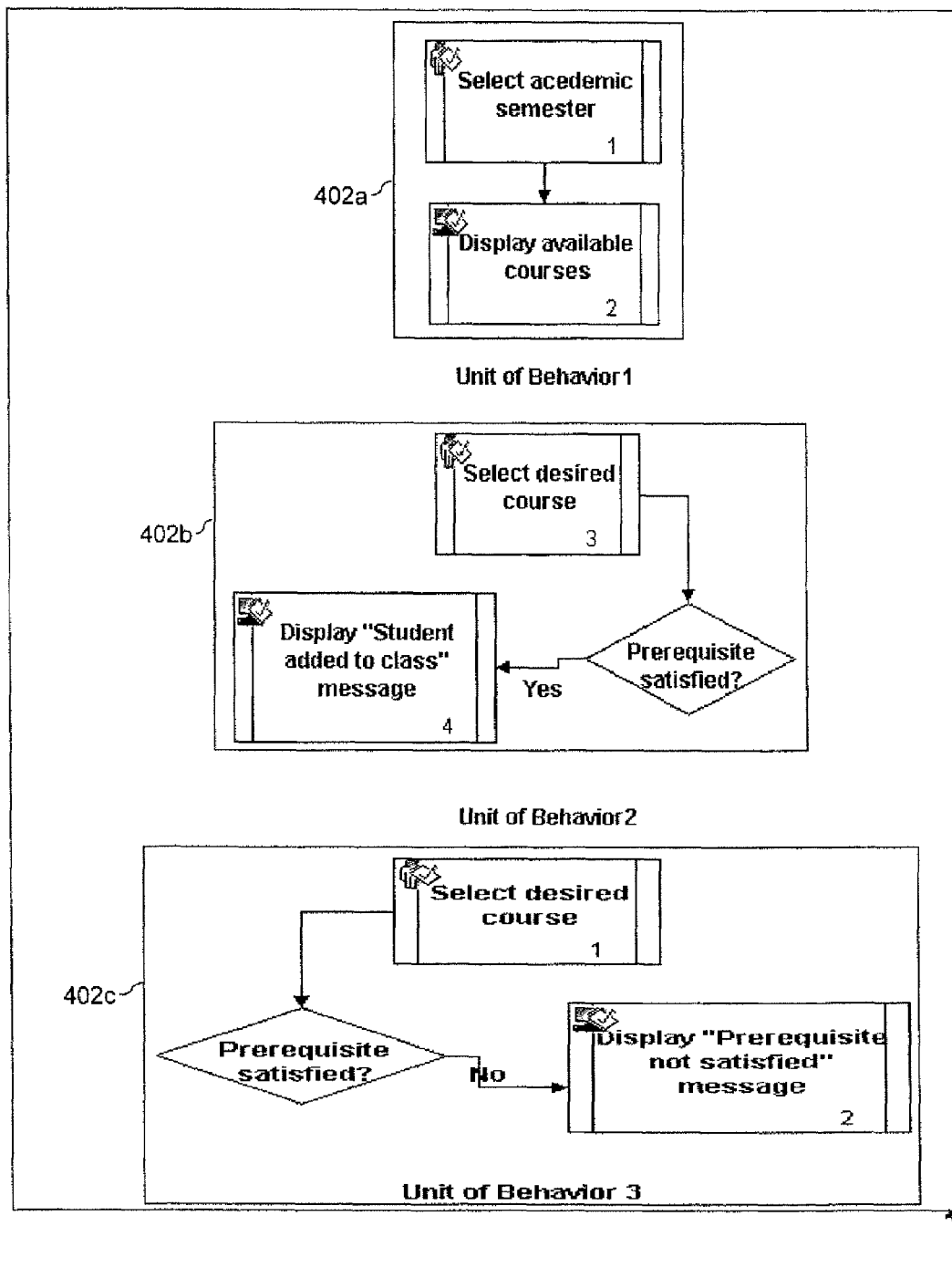
FIG. 4 is a snapshot depicting units of behavior, in accordance with an exemplary embodiment of the invention.

Each use-case activity diagram that is developed based on a predefined set of rules includes the ordered sequence of a plurality of units of behavior. A unit of behavior consists of an indivisible logical unit of input, processing of the input, a set of conditions, and an output. The input is provided by either by a user, a system developed for executing the functional test cases or a software application. For example, a trigger from an electronic timer on reaching a set time can be used as an input. Further, the set of conditions includes zero or more conditions specified by a user. In an embodiment of the invention, the set of conditions are specified by a business user(s) or person using the software application. Furthermore, the output is based on the processing of the input and the set of conditions by the system developed for executing the functional test cases. Once the input is received, it is processed by the system. In an embodiment of the invention, the system developed for executing the functional test cases includes a data processing unit. Based on the processing of the input and the set of conditions that are true, the output is generated by the system. An exemplary snapshot of a unit of behavior is depicted in FIG. 4. Further, each use-case activity diagram includes all exceptions that are possible for a particular functionality or use case scenario represented by the use-case activity diagrams.

At step 104, consistency of the use-case activity diagrams developed at step 102 is checked. The consistency of the use-case activity diagrams is checked automatically without any manual intervention. The consistency check of the use-case activity diagrams includes checking whether the predefined set of rules has been followed or not during the development of the use-case activity diagrams. In other words, the consistency check refers to checking whether each use-case activity diagram is structured or not, i.e., whether each use-case activity diagram includes a complete and an ordered sequence of multiple units of behavior or not. The process of checking the consistency of the use-case activity diagrams has been explained in detail in conjunction with FIG. 3. Further, at step 104, the use-case activity diagrams are updated based on the consistency check. If a use-case activity diagram is identified as inconsistent, it is updated with the predefined set of rules in order to make it consistent. In an embodiment of the invention, the use-case activity diagram is updated by adding, deleting and/or modifying nodes/description of the nodes in the use-case activity diagram. Further, the use-case activity diagrams are updated by the business user(s) and/or the software developer.

At step 106, the consistent use-case activity diagrams are validated with one or more users. The use-case activity diagrams that are updated at step 104, based on the consistency check, are also validated with the users. In an embodiment of the invention, the use-case activity diagrams are validated with the business user(s). In another embodiment of the invention, the use-case activity diagrams are validated with the software developer. The validation of the use-case activity diagrams includes checking whether the entire business functionality of the software application is covered or not. In an embodiment of the invention, the validation of the use-case activity diagrams is performed manually by the business users. In another embodiment of the invention, the validation of the use-case activity diagrams is performed manually by the software developer. The client reviews and validates each path in the structured use-case activity diagram. The validation is performed in terms of a complex behavior being composed of a logical or ordered sequence of multiple units of behavior.

At step 106, the validated use-case activity diagrams are updated or refined on the basis of one or more requirements or inputs of the users. If it is determined that a validated use-case activity diagram does not cover one or more aspects of the business functionality of the software application, the particular use-case activity diagram is updated. The use-case activity diagram is updated to incorporate the inputs/feedback provided by the business users and therefore, covers the entire the business functionality of the software application. In an embodiment of the invention, the use-case activity diagram is updated by adding one or more units of behavior in the use-case activity diagram. Each unit of behavior thus added represents at least one step used to obtain the business functionality of the software application. In another embodiment of the invention, the use-case activity diagram is updated by correcting error(s) in the use-case activity diagrams.

At step 106, the criticality of the multiple units of behavior in the use-case activity diagram is also identified. In an embodiment of the invention, the criticality of the units of behavior is divided into various levels such as highly critical, moderately critical, and lowly critical. The units of behavior are accordingly marked as highly critical, moderately critical, and lowly critical in the corresponding use-case activity diagrams. It will be evident to a person skilled in the art that the criticality of the units of behavior can be categorized into various other levels having different representation(s). Each unit of behavior is classified based on the criticality of the particular unit of behavior. In an embodiment of the invention, the criticality of the units of behavior is identified manually by the software developer. In another embodiment of the invention, the criticality of the units of behavior is identified manually by the business user(s).

In an embodiment of the invention, at step 106, a plurality of use-case activity diagrams for one or more software applications are linked together. The linking of the use-case activity diagrams facilitates the reusability of the use-case activity diagrams. The one or more use-case activity diagrams generated for a software application may be reused in another software application. Further, the use-case activity diagrams generated for a software application can be linked to one or more use-case activity diagrams of the same or different software application. The linking of the use-case activity diagrams is explained in detail in conjunction with FIG. 8(*a*) and FIG. 8(*b*).

At step 108, one or more functional test cases are generated from the validated use-case activity diagrams. Further, the functional test cases are generated from the use-case activity diagrams that are updated at step 106 based on the validation by the one or more users. Furthermore, the functional test cases are generated from the linked use-case activity diagrams. The functional test cases are generated automatically without any manual intervention. In an embodiment of the invention, the functional test cases are generated automatically using a tool developed by Infosys Corporation, the assignee of the present application. In another embodiment of the invention, the functional test cases are generated automatically using different tools such as Conformiq Qtornic, UniTESK and the like. The tool facilitates a software developer to automatically generate functional test cases from the structured, consistent, and validated use-case activity diagrams.

The functional test cases are generated from the use-case activity diagrams represented in the form of cyclic directed graphs. The functional test cases are generated by traversing each path of the use-case activity diagram represented in the form of cyclic directed graphs. The nodes of the use-case activity diagram are identified using one or more identification tags. The nodes are processed for generating the functional test cases. The processing of the nodes is based on the identification tags of the nodes. The nodes and their identification tags have been explained in conjunction with FIG. 3.

The automatic generation of the functional test cases includes the use of a test case generation algorithm. An exemplary test case generation algorithm can be implemented by using the following code:

```
algorithm : getTestcases
input : structured UCADgraph
ouput : test cases
begin getTestcases
For each UCAD node n in UCADgraph do
    curTask := n
    Next := Getnext(curTask)
    // If there is only one child node
    If Getchild(Next) == 1
        If Next(e_s,e_d) € curPath
            Nextedge = Get(0,next)
            Addelement(Nextedge, curPath)
            curTask := Gettarget(Nextedge)
        Else
            Nextedge := pop(EdgeStack)
            Addelement(Nextedge, curPath)
            curTask := Gettarget(Nextedge)
        End if
    //If there are more than 2 child nodes
    If Getchild(Next ) >=2
        If Next(e_s,e_d) € curPath
            For each edge(e_s,e_d) j do
                Push(j, EdgeStack)
                Push(j, PathStack)
            End for
        Else
            For each edge(e_s,e_d) j do
                Push(j, EdgeStack)
                Push(j, PathStack)
            End for
        End if
        If Edge is not empty
            Nextedge := pop(EdgeStack)
            curPath := pop(PathStack)
            If Next(e_s,e_d) € curPath
                Addelement(Nextedge, curPath)
                curTask := Gettarget(Nextedge)
            Else
                Nextedge := pop(EdgeStack)
                Addelement(Nextedge, curPath)
                curTask := Gettarget(Nextedge)
            End if
        End If
    //If there are no child nodes
    If Getchild(Next) ==0
        If Edge is not empty
            Addpath(curPath, foundPaths)
            Nextedge := pop(EdgeStack)
            curPath := pop(PathStack)
            If Next(e_s,e_d) € curPath
                Addelement(Nextedge, curPath)
                curTask := Gettarget(Nextedge)
            Else
                Nextedge := pop(EdgeStack)
                Addelement(Nextedge, curPath)
                curTask := Gettarget(Nextedge)
            End if
        End If
        Else
            Addpath(curPath, foundPaths)
        End If
        Return foundPaths
End getTestcases
```

The test case generation algorithm performs a depth-first search of the use-case activity diagram and extracts all paths of the use-case activity diagrams. Since a use-case activity diagram is a cyclic graph, all cyclic sub-paths of the use-case activity diagram are traversed for a predefined number of times. The predefined number of traversals varies from one to a finite number. The number of traversals of the cyclic sub-paths is selected by the software developer or the software tester. Further, for each path extracted from the use-case activity diagram, the test case generation algorithm slices the path into an ordered sequence of units of behavior. The paths thus extracted are used to generate the functional test cases. Each unit of behavior in a particular path is extracted and represented as a single test case step. Further, the path starting from a start node or an initial node to an end node or a final node consists of multiple units of behavior and is extracted and represented as a single test case. Therefore, the number of test cases generated for a particular use-case activity diagram is equal to the number of paths in the use-case activity diagram and the number of all cyclic sub-paths traversed. Exemplary snapshots of test cases corresponding to a particular use-case activity diagram are depicted in FIG. 6(*a*), FIG. 6(*b*), and FIG. 6(*c*). In an embodiment of the invention, the functional test cases thus generated are tabulated into a Hyper Text Markup Language (HTML) page or a Microsoft® Excel sheet or an Extended Markup Language (XML) document or a simple text (TXT) document.

At step 108, the generated functional test cases are further prioritized based on the criticality of the units of behavior. In an embodiment of the invention, based on the classification of the units of behavior, the corresponding test cases are also marked as highly critical, moderately critical, and lowly critical. Based on the classification of the functional test cases, they are prioritized for their use and applicability in testing the software application.

Figure 2:
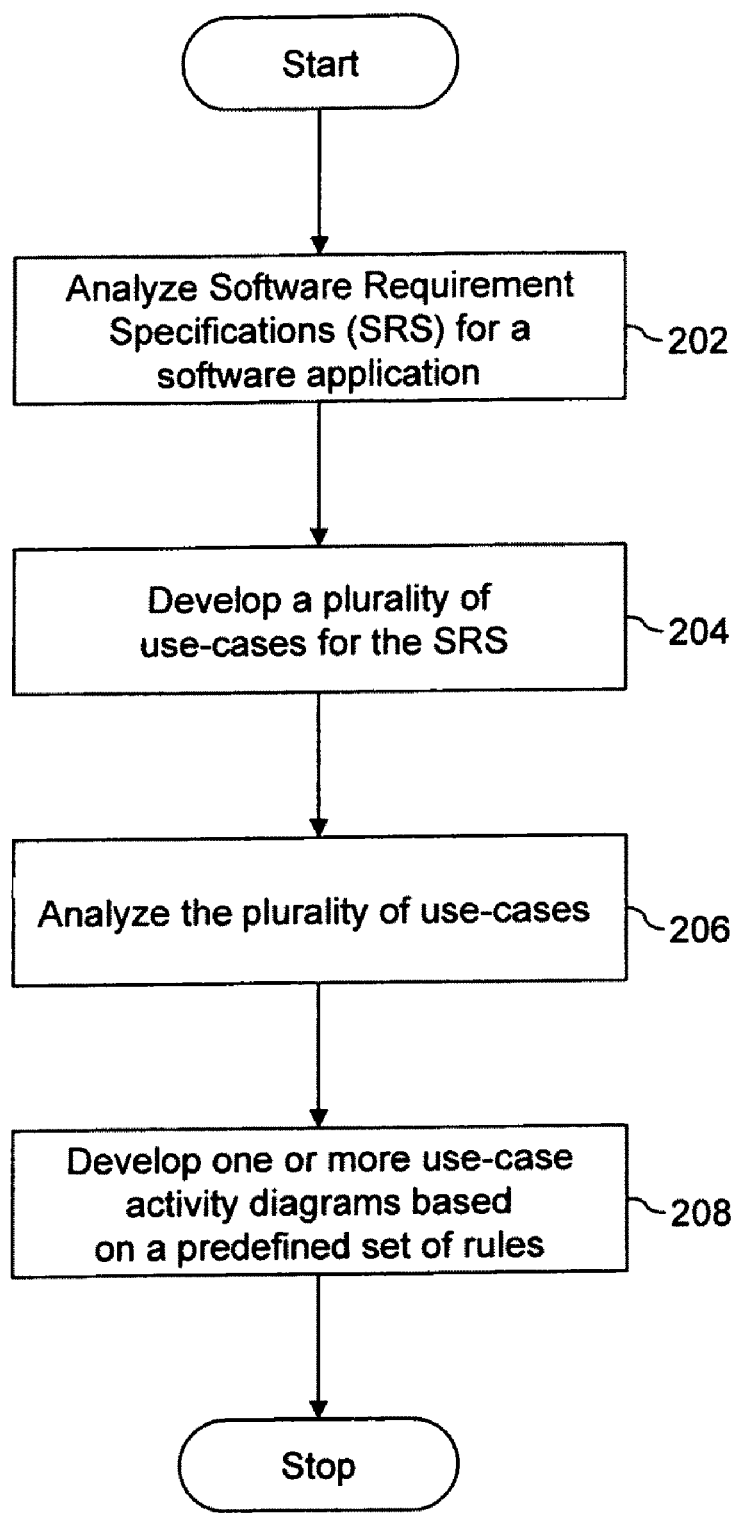
FIG. 2 is a flowchart of a method for developing use-case activity diagrams, in accordance with an embodiment of the invention.

FIG. 2 is a flowchart of a method for developing use-case activity diagrams, in accordance with an embodiment of the invention.

The use-case activity diagrams are developed for generating one or more functional test cases used for testing a software application, as explained in conjunction with FIG. 1. The development of the use-case activity diagrams includes structuring of the use-case activity diagrams into an ordered sequence of a plurality of units of behavior.

At step 202, Software Requirements Specifications (SRS) for the software application is analyzed. The SRS provides a complete description of the behavior or the functionality of the software application to be developed. The SRS includes one or more functional requirements for the software application in terms of the level of interactions of the users with the software application. The SRS is provided by one or more users of the software application. In an embodiment of the invention, the SRS is provided by the business users. The analysis of the SRS is performed manually by the software developer.

At step 204, a plurality of use-cases is developed for the SRS. A use case describes functional requirements of the software application. Therefore, a single use case or multiple use cases can be developed for a single SRS. In an embodiment of the invention, the use cases are identified from the SRS. The use cases are developed or identified manually by the software developer.

At step 206, the plurality of use cases developed at step 204 are analyzed. Each of the plurality of use cases for a software application is analyzed for developing the use-case activity diagrams. The analysis of the use cases includes identification of a plurality of units of behavior from the multiple use cases. The units of behavior have been explained in detail in conjunction with FIG. 1 and FIG. 4. Each use case describes or represents a complex behavior of the software application. The analysis of the use case includes decomposition of the complex behavior described by the use cases into multiple units of behavior. In an embodiment of the invention, the units of behavior are identified from the plurality of use cases on the basis of a predefined set of rules. The predefined set of rules is based on slicing of the behavior described in the use cases. The behavior is sliced into the plurality of units of behavior such that each unit of behavior includes an indivisible logical unit of an input, processing of the input and an output based on the processing of the input, and a set of conditions.

At step 208, the one or more use-case activity diagrams are developed based on a predefined set of rules. Each use-case activity diagram corresponds to a functionality of one or more use cases of the software application. For example, a use-case activity diagram corresponding to the validation of a Personal Identification Number (PIN) of a debit card or a credit card can be used for the use cases corresponding to different ATM operations as well as different credit card operations. Further, the functionality of each use-case of the software application can be represented using multiple use-case activity diagrams. For example, a use case for different operations at an ATM can be represented using different use-case activity diagrams for the corresponding operations to be performed.

A use-case activity diagram represents the behavior or functionality of the corresponding one or more use cases. The plurality of units of behavior identified at step 206 is used for the development of the use-case activity diagrams. The use-case activity diagrams thus developed are such that each use-case activity diagram is an ordered sequence of the plurality of units of behavior. In an embodiment of the invention, the development of the use-case activity diagrams includes structuring of the use-case activity diagrams. The multiple units of behavior identified at step 206 are structured into an ordered sequence and are therefore used for developing the use-case activity diagrams. Further, each use-case activity diagram includes all exceptions that are possible for a particular functionality or use case scenario represented by the use-case activity diagrams.

FIG. 3 is a snapshot 300 depicting a use-case activity diagram, in accordance with an exemplary embodiment of the invention. Snapshot 300 depicts a use-case activity diagram for a use case of an academic course registration system at a university. The use case depicted by the use-case activity diagram is 'select desired academic courses'. The use case thus depicted is a logical sequence of the following activities:

Select academic semester

Display courses available in the selected semester

Select desired academic course

Check if the prerequisite is satisfied by a student

If the student satisfies the prerequisite, display a message, 'Student added to the class'

If the student does not satisfy the prerequisite, display a message, 'Prerequisite not satisfied'

As explained in conjunction with FIG. 1, each use-case activity diagram is a directed cyclic graph. The graphical representation of the use-case activity diagram includes different types of nodes, for example, a user action node or a user task node or a user input (or other system) node, a system processing node, a conditions node, and a system output node. Each node is denoted or identified by its identification tag. For example, a user action node or a user input node is denoted by UI, a system task node or a system action node or a system input node is denoted by SI, a system processing node is denoted by SP, a conditions node is denoted by C, and a system output node is denoted by SO. Therefore, the different activities of the use case, for example, the 'select desired academic courses' activity, are represented in the use-case activity diagrams in the form of the following nodes:

UI: Select academic semester

SP: System reads the available courses for selected semester

SO: Display courses available in the selected semester

UI: Select desired course

SP: System reads the prerequisite for the selected course

C: If a student satisfies the prerequisite

SO: System displays 'Student added to class' message

SO: System displays 'Prerequisite not satisfied' message

In an embodiment of the invention, the processing of the inputs is performed implicitly by the system and is not denoted explicitly in the use-case activity diagrams. Therefore, the system processing nodes (denoted by SP) are optional, and are hence not denoted in the use-case activity diagrams.

Since each use-case activity diagram includes multiple units of behavior, the different nodes of the use-case diagram are also included in the units of behavior, as illustrated in conjunction with FIG. 4. The condition nodes are optional for each unit of behavior in the use-case activity diagram.

In an embodiment of the invention, the use-case activity diagrams are represented in the Unified Modeling Language (UML). The UML facilitates creation and addition of two types of nodes in addition to the nodes included in the use-case activity diagram. The two types of nodes added to the use-case activity diagrams are a start node (denoted by SR)

depicted as 302 in snapshot 300 and an end node or a stop node (denoted by ST) depicted as 304 in snapshot 300. The use-case activity diagram includes a single start node, but can have multiple stop nodes. Further, the use-case activity diagrams include two additional types of nodes—fork node and join node. The fork node and the join node have been explained in conjunction with FIGS. 5(*a*) and 5(*b*). In another embodiment of the invention, various business modeling languages use logical gates such as AND, OR and XOR gates in place of the fork node, the join node and the conditions node.

The nodes of the use-case activity diagram are also marked based on the criticality of the units of behavior included in the use-case activity diagram. Each activity or task of the unit of behavior is also categorized based on its criticality. Therefore, the user task nodes and/or the system task nodes of the use-case activity diagram are marked with [H], [M], and [L], where H represents highly critical, M represents moderately critical and L represents lowly critical activity or task. It will be evident to a person skilled in the art that the criticality of the nodes can be represented using different alphanumeric notations. Further, the test cases are generated with a criticality depending on the criticality of the tasks/activities involved in the use-case activity diagrams corresponding to the respective test cases. For example, a test case has a high criticality if one of the tasks in its use-case activity diagram is marked as highly critical.

The graphical representation of the functionality of use cases in the form of use-case activity diagrams facilitates decomposition or slicing of the use cases into an ordered or logical sequence of multiple units of behavior. The slicing also facilitates the exceptions to be recorded in the form of units of behavior in the use-case activity diagrams.

The graphical representation of the use cases in the form of use-case activity diagrams also facilitates checking the consistency of the use-case activity diagrams. The use-case activity diagrams are structured according to the predefined set of rules into an ordered sequence of units of behavior. These structured use-case activity diagrams should satisfy the following consistency properties or consistency rules:

There is only one start node (denoted by SR) in the use-case activity diagrams.

Every path from the start node to a stop node (denoted by ST) contains an ordered sequence of one or more units of behavior. This path includes cyclic sub-paths traversed for one to a finite number of times.

Each unit of behavior in the use-case activity diagrams begins with one or more consecutive user input nodes (denoted by UI), followed by one or more consecutive system processing nodes (denoted by SP), and zero or more condition nodes (denoted by C), and finally concludes with one or more consecutive system output nodes (denoted by SO).

Each use-case activity diagram should include one start node, one stop node, one user input node and one system output node.

Each flow or path, main or alternate, should terminate to a stop node.

Each user task node, system task node or a condition node should be connected through transitions between the nodes.

Each fork node needs to have one incoming and multiple outgoing transitions. It cannot have one incoming and one outgoing transition.

Each join node needs to have one outgoing and multiple incoming transitions. It cannot have one incoming and one outgoing transition.

A system output node should be followed by either a user task node or a stop node.

A user task node should be followed by another user task node, a system task node, and a system output node.

A condition node should be followed by another condition node, a system task node or a system output node.

FIG. 4 is a snapshot 400 depicting units of behavior 402, in accordance with an exemplary embodiment of the invention. Snapshot 400 depicts units of behavior 402, for example, units of behavior 402*a*, 402*b*, and 402*c*, identified from the use-case activity diagram depicted in conjunction with FIG. 3. The units of behavior thus depicted are identified for the use case 'select desired academic courses' of an academic course registration system at a university. The use case is analyzed for identifying the multiple units of behavior from the use cases. The units of behavior are identified based on the predefined set of rules, as explained in conjunction with FIG. 1 and FIG. 2. Therefore, based on a predefined set of rules, three units of behavior are identified from the use case 'select desired academic courses' depicted in conjunction with FIG. 3. The units of behavior are depicted using the different types of nodes, as explained in conjunction with FIG. 3. The following is unit of behavior 402*b*, depicted as Unit of Behavior 2 in snapshot 400, for the use case 'select desired academic courses':

UI: Select desired course
SP: System reads the prerequisites for the selected course
C: If a student satisfies the prerequisites
SO: System displays 'Student added to class' message Similarly, two other units of behavior are identified from the use case 'select desired academic courses'.

As explained in conjunction with FIG. 1, each unit of behavior is a logical unit consisting of an input, system processing of the input, a set of conditions, and a system output. Each unit of behavior in the use-case activity diagrams begins with one or more consecutive user input nodes (denoted by UI), followed by one or more consecutive system processing nodes (denoted by SP), and zero or more condition nodes (denoted by C), and finally ends with one or more consecutive system output nodes (denoted by SO).

FIGS. 5(*a*) and 5(*b*) is a snapshot 500 depicting a use-case activity diagram, in accordance with another exemplary embodiment of the invention. Snapshot 500 depicts a use-case activity diagram for a use case for ATM operations in a bank. The use case depicted by the use-case activity diagram is 'operating an ATM'. The use case thus depicted is a logical sequence of a set of activities, for example, insert an ATM card, enter a Personal Identification Number (PIN), and so forth. The use-case activity diagram depicted in snapshot 500 includes one or more of the different types of nodes such as a start node, a user input node, a system processing node, a conditions node, a system output node, and a stop node.

In addition to the different types of nodes, the use-case activity diagram includes a different type of node—a fork node, depicted as 502 in snapshot 500. A fork node is a type of node which has a single input path and multiple output paths. The paths that follow the fork node in a use-case activity diagram include activities that can be processed simultaneously. For example, in the use-case activity diagram depicted in snapshot 500, once a person has logged in successfully, different operations such as withdraw cash, change PIN, and so forth, can be performed simultaneously. If the fork node is absent in the use-case activity diagram, the different activities although unrelated are represented sequentially, and therefore, need to be sequentially processed. Further, the functional test cases for the use cases that pass through the fork node are tagged as the execution of these functional test cases is synchronized with the execution of other functional test cases.

The use-case activity diagram also includes another type of node known as join node, depicted as 504 in snapshot 500. A join node has multiple input paths and a single output path. The paths that precede the join node include activities that can be processed simultaneously. For example, in the use-case activity diagram for the use case 'operating an ATM' illustrated in FIGS. 5(*a*) and 5(*b*), the different operations that can be performed simultaneously include withdraw cash, change PIN, and so forth. These operations are followed by a common set of activities such as a display message 'Transaction Completed. Do you want a printout of the transaction?' and so forth. The common set of activities is preceded by a join node in the use-case activity diagram. If all the simultaneous paths are followed by a common set of activities, then these common activities are preceded by a join node and are represented sequentially in a single path in the use-case activity diagram. These common activities are processed for each of the paths preceding the join node. These common activities are processed after the processing of activities preceding the join node. Therefore, the join node allows a single representation of common activities of all alternate paths.

FIG. 6(*a*), 6(*b*) and 6(*c*) depict diagrammatical representations of functional test cases 602, in accordance with an exemplary embodiment of the invention. Functional test cases 602 correspond to the use case 'operating an ATM' explained in conjunction with FIG. 5. Functional test cases 602 include functional test case 602*a*, functional test case 602*b*, functional test case 602*c*, functional test case 602*d*, functional test case 602*e*, and functional test case 602*f*, and are represented in a Microsoft® Excel format, as illustrated in conjunction with FIG. 6(*a*), 6(*b*), and 6(*c*). Functional test cases 602 are generated from the use-case activity diagram illustrated in snapshot 500 in FIG. 5. The functional test cases are generated for each logical path starting from a start node and ending with a stop node in the use-case activity diagram. Further, the cyclic sub-paths in each path of the use-case activity diagram are traversed for a predefined number of times.

Functional test cases 602 also referred to as test scenarios, include one or more preconditions, criticality, and one or more test steps. The preconditions for a functional test case, hereinafter referred to as test case, refer to the conditions that need to be checked before the execution of the test case. For example, declaration of variables used in one or more tasks, assigning values to variables, checking or comparing values of the variables, and so forth. Criticality refers to the importance of the execution of a test case and is determined on the basis of the criticality of units of behavior, as explained in conjunction with FIG. 1. A test case can have a criticality value of high, medium or low. The test steps describe the one or more steps that need to be performed for executing the test case. Each test step in the test case corresponds to a single unit of behavior in the use-case activity diagram.

The test steps are described in terms of description details, input, conditions, expected output, actual output, and remarks. The description details provide information on whether the test case is synchronized with other test cases or not. The test cases for the use cases that pass through the fork node are marked as synchronized with other functional test cases. In an embodiment of the invention, the input required for each and every test step is provided by the user. In another embodiment of the invention, the input required for each and every test step is obtained from a system. The conditions refer to the checks that need to be performed while executing the particular test steps. The expected output of a test step refers to the output for the test step based on the input and the conditions. The output is generated by a system executing the functional test step or test case. For example, if an ATM card is entered as input and the condition 'Card inserted properly' is true, then the expected output is to display a message to enter the PIN. The actual output of a test step refers to the output that is generated by the system on executing the test step. It will be evident to a person skilled in the art that the actual output can be different from the expected output. The remarks are the comments provided by the software developer or the testing team on the basis of the expected output and the actual output. For example, functional test case 602*a* illustrates a test case corresponding to a use case in which a user wants to change a PIN of an ATM card. Functional test case 602*a* includes test steps for the various units of behavior in a path of the use-case activity diagram. The path corresponds to successfully changing a PIN of an ATM card. Similarly, functional test cases 602*b*, 602*c*, 602*d*, 602*e*, and 602*f* correspond to the different paths in the use-case activity diagram for the use case 'operating an ATM'.

Figure 7:
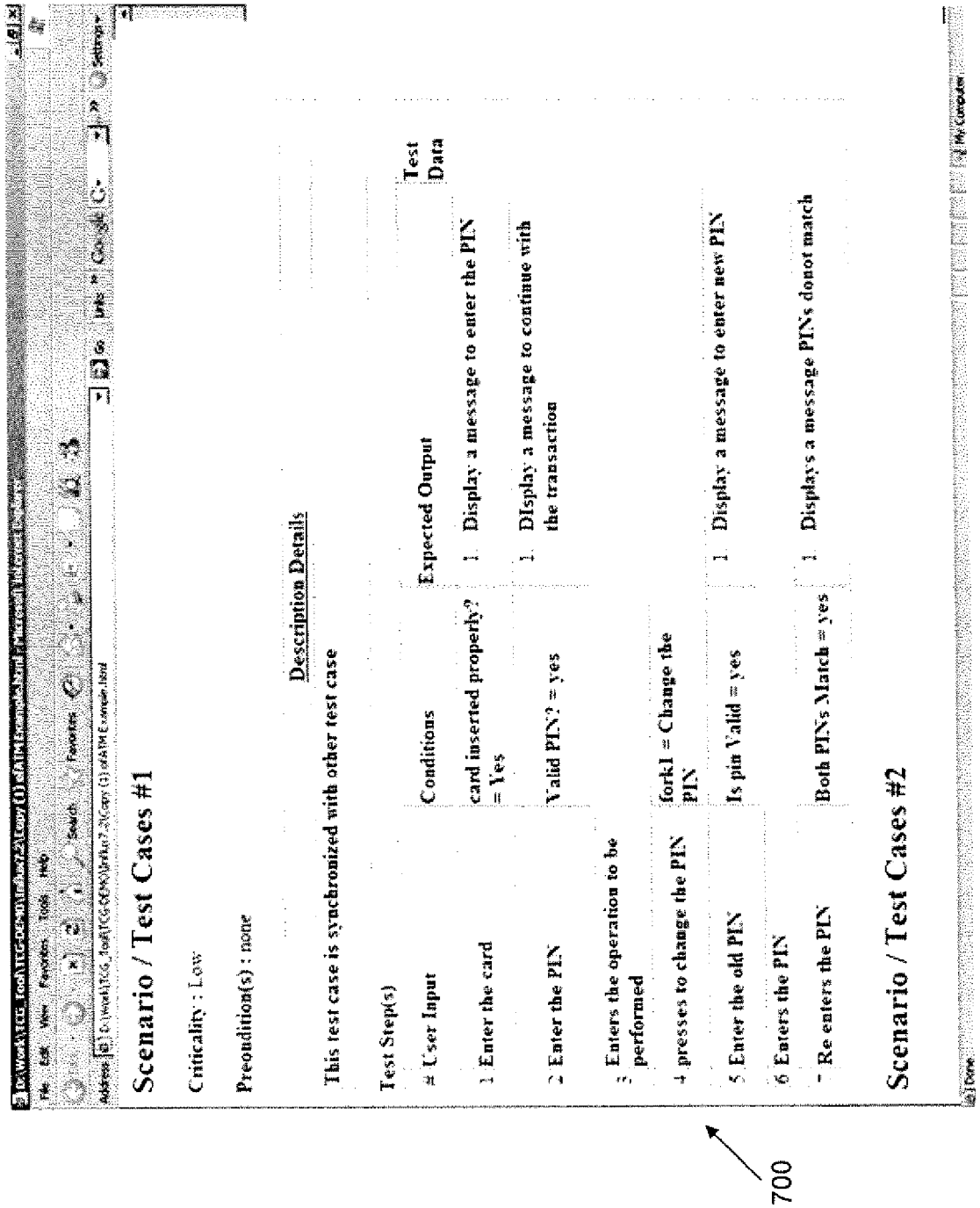
FIG. 7 is a snapshot depicting a functional test case, in accordance with another exemplary embodiment of the invention.

FIG. 7 is a snapshot 700 depicting a functional test case, in accordance with another exemplary embodiment of the invention. Functional test case corresponds to the use case for changing a PIN of an ATM card at a bank, as explained in conjunction with FIG. 5. The functional test case illustrated in conjunction with FIG. 7 is represented in a Hyper Text Markup Language (HTML) format. The functional test cases are generated for each logical path starting from a start node and ending with a stop node in the use-case activity diagram corresponding to the use case. Further, the cyclic sub-paths in each path of the use-case activity diagram are traversed for a predefined number of times.

The functional test case illustrated in conjunction with FIG. 7 includes one or more preconditions, a user input, one or more conditions, an expected output, and test data. The preconditions refer to the conditions that need to be checked before the execution of the test case. The user input is a set of inputs provided by the user for executing the test case. The conditions refer to the checks that need to be performed while executing the test case. The expected output refers to the output that should be generated by the system executing the test step, based on the user input and the conditions. The test data refers to a set of data required for the execution of the test step or the test case. For example, the input for the use case for changing a PIN of an ATM card includes user enters the card, the PIN and selects the operation of changing the PIN. Further, the user enters the old PIN and the new PIN. The user also re-enters the new PIN. The condition that needs to be checked is whether the ATM card is inserted properly or not, whether the PIN is valid or not and also whether the new PIN and the old PIN match or not. The expected output generated by the system is displaying a message that PINs do not match in case both the PINs do not match. Similarly, the test cases for other paths of the use-case activity diagrams corresponding to the use cases are generated.

FIGS. 8(*a*) and 8(*b*) is a snapshot 800 and a snapshot 802, respectively, depicting linking of use-case activity diagrams, in accordance with an exemplary embodiment of the invention. Snapshot 800 depicts a use-case activity diagram for a use case of validating a PIN of an ATM card in a bank. Snapshot 802 depicts a use-case activity diagram for a use case for different ATM operations performed at the bank.

A plurality of use-case activity diagrams for similar or different software applications can be linked together. The linking of the use-case activity diagrams facilitates reusability of the use-case activity diagrams in different software applications for the same or a different organization. The use-case activity diagrams are linked together by calling a use-case activity diagram in another use-case activity diagram. The linking of the use-case activity diagrams is performed for multiple use-cases that have a set of common activities. The common activities are then represented as a use-case activity diagram which is further used by the different use-case activity diagrams. For example, for ATM operations in a bank, the activities for validating the user PIN are common for various activities, for example, withdrawing cash, changing a PIN, depositing money, and so forth. Therefore, the activities for validating the user PIN are considered as one use case and represented by a single use-case activity diagram. This use-case activity diagram is then used by the use-case activity diagrams for different use cases, for example, cash withdrawal, change PIN, and so forth, as illustrated in conjunction with FIGS. 8(a) and 8(b). Further, since the two operations, withdrawing cash and changing a PIN, can be performed simultaneously, the set of activities for these operations are joined together by a fork node in the use-case activity diagrams, as illustrated in conjunction with FIGS. 8(a) and 8(b).

Figure 8A:
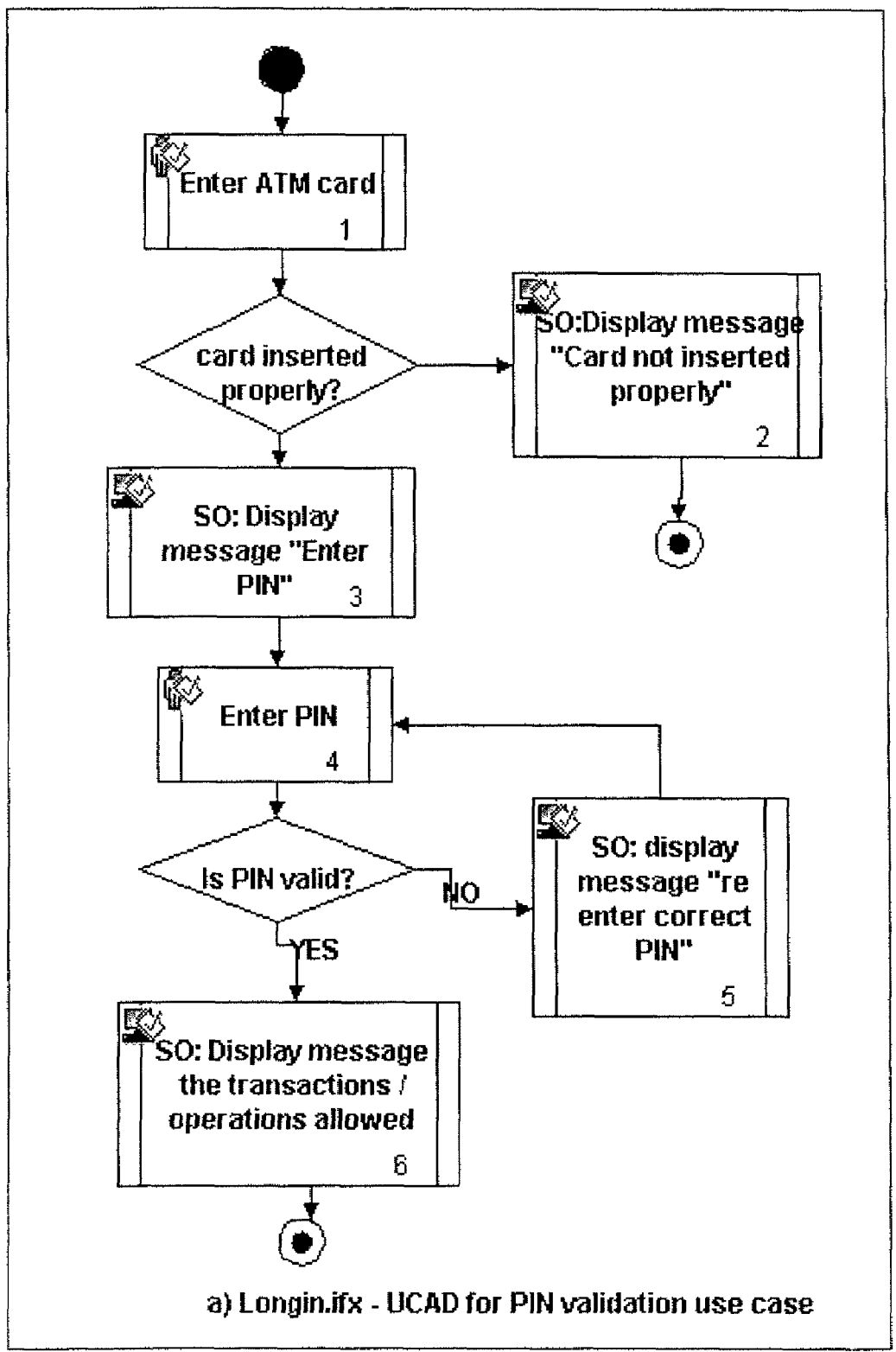
FIGS. 8(a) and 8(b) are snapshots depicting linking of use-case activity diagrams, in accordance with an exemplary embodiment of the invention.
Figure 8B:
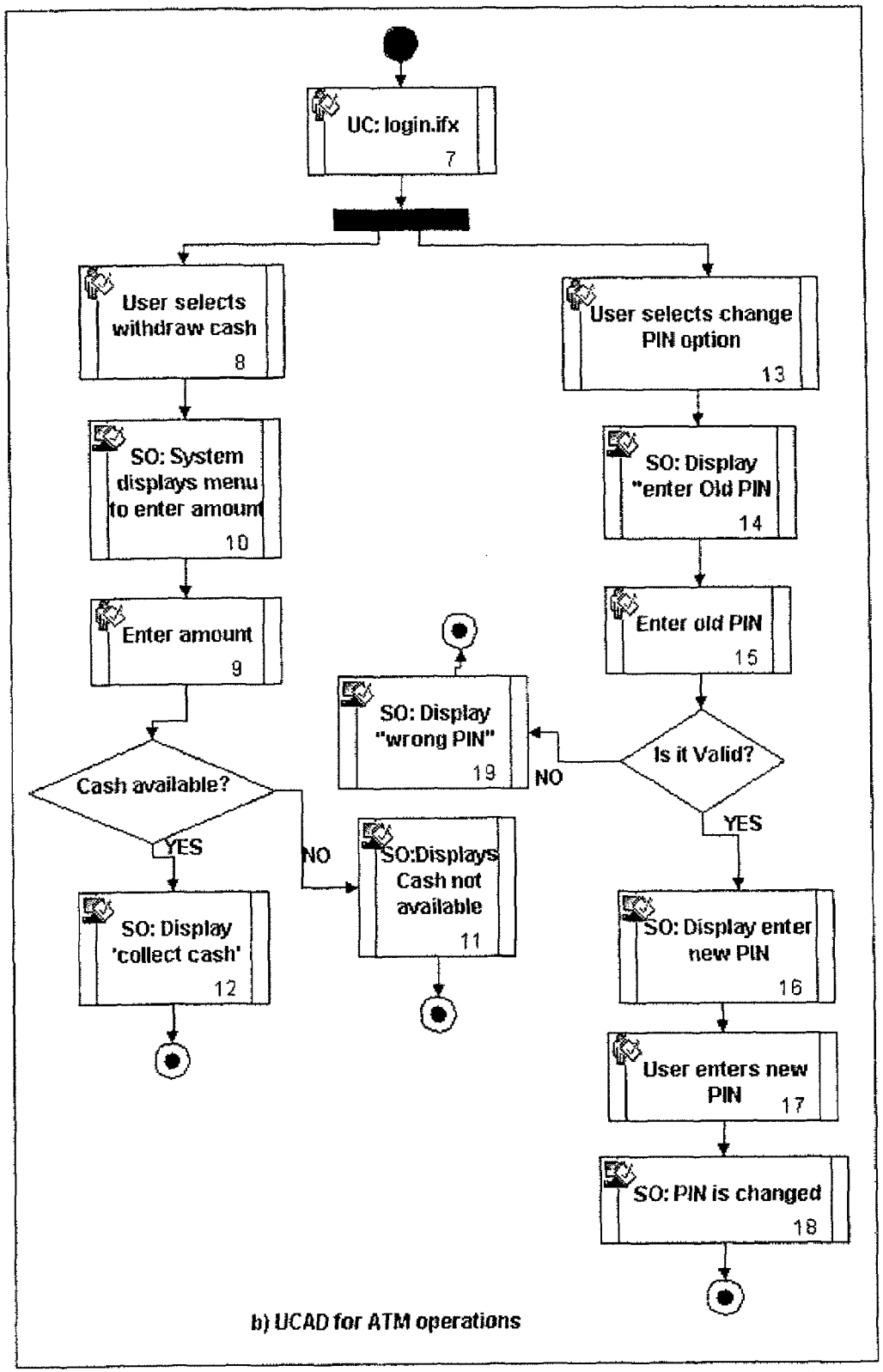

In an embodiment of the invention, the use-case activity diagram to be linked or inserted is identified by prefixing 'UC' in the description of the node in the use-case activity diagram, as illustrated in conjunction with FIGS. 8(a) and 8(b). In another embodiment of the invention, if more than one final node or stop node exists in the use-case activity diagram to be linked, then the description of one of the stop nodes is specified along with the string 'CONTINUE' for the properties of the stop node. The path containing the stop node with the 'CONTINUE' string becomes the primary path that needs to be traversed in the main use-case activity diagram. However, the other alternate paths containing other stop nodes will not be further traversed.

The linking of the use-case activity diagrams also addresses the scalability issue of the use-case activity diagrams for a large and complex use case functionality or behavior. The large functionality is decomposed into a set of sub-functionalities and separate use-case activity diagrams are developed for each of the sub-functionalities. All use-case activity diagrams can then be linked to the main use-case activity diagram developed for the main use case, thereby reducing the clumsiness in the use-case activity diagrams.

Figure 9:
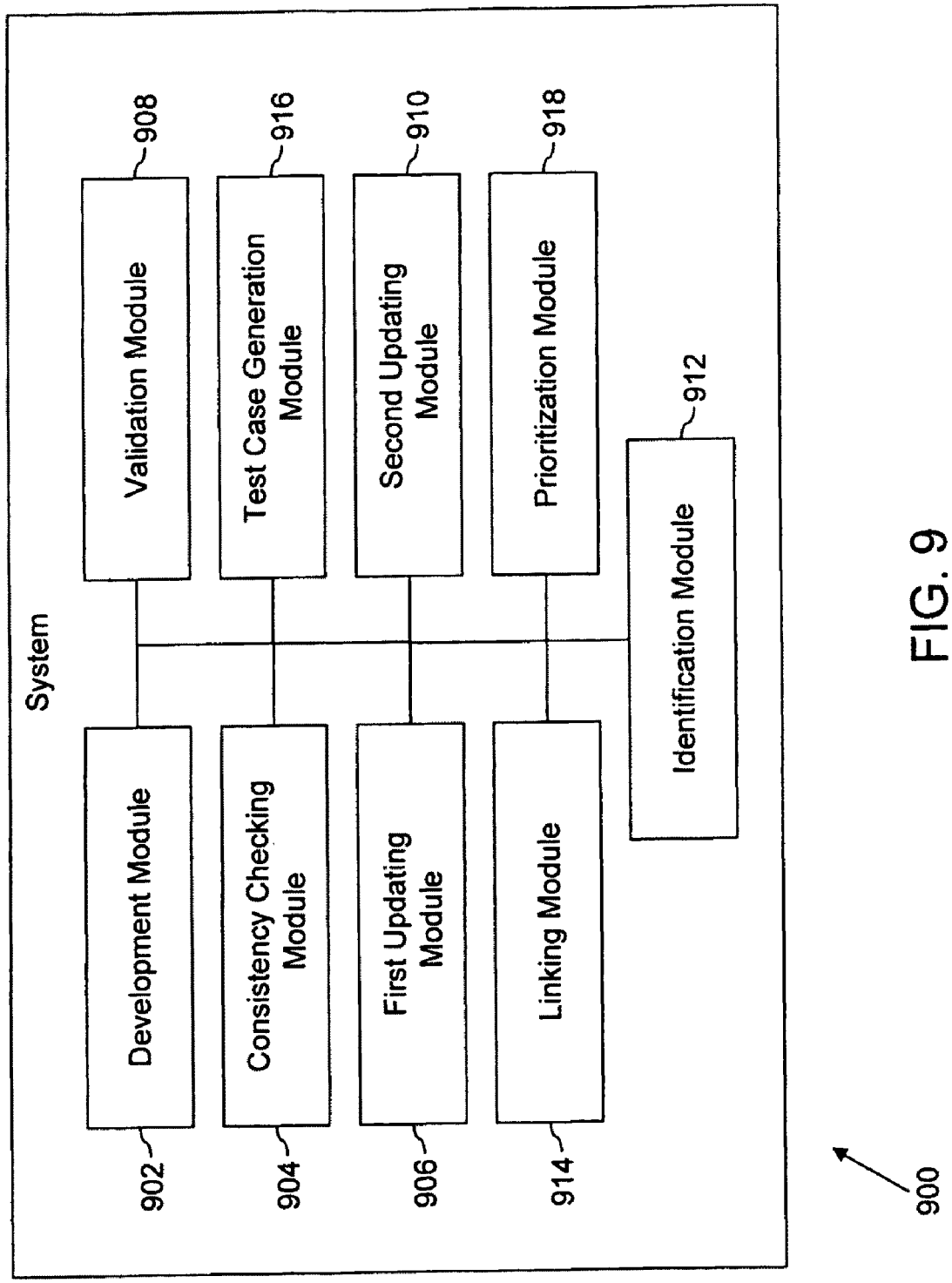
FIG. 9 is a block diagram of a system for developing functional test cases, in accordance with an embodiment of the invention.

FIG. 9 is a block diagram of a system 900 for developing functional test cases, in accordance with an embodiment of the invention. System 900 includes a development module 902, a consistency checking module 904, a first updating module 906, a validation module 908, a second updating module 910, an identification module 912, a linking module 914, a test case generation module 916, and a prioritization module 918.

Development module 902 is configured for enabling at least one user to develop one or more use-case activity diagrams for the software application. The use-case activity diagrams are developed on the basis of a predefined set of rules. The use-case activity diagrams have been explained in detail in conjunction with FIG. 1, FIG. 3 and FIG. 5. Each use-case activity diagram that is developed on the basis of a predefined set of rules includes an ordered sequence of a plurality of units of behavior. The units of behavior have been explained in detail in conjunction with FIG. 1 and FIG. 4.

The development of the use-case activity diagrams includes structuring of the use-case activity diagrams into the ordered sequence of units of behavior. Further, the predefined set of rules used for developing the use-case activity diagrams is based on slicing of the behavior represented by the use-case activity diagrams. The behavior is sliced into the plurality of units of behavior. Each use-case activity diagram represents a complex behavior of the software application. The predefined set of rules is based on decomposing or slicing the complex behavior into multiple units of behavior. The development of the use-case activity diagrams based on the predefined set of rules is described in detail in conjunction with FIG. 2. In an embodiment of the invention, the use-case activity diagrams are developed by a software developer.

Development module 902 is further configured for enabling the user to analyze a Software Requirements Specifications (SRS) for the software application. The SRS provides a complete description of the behavior or the functionality of the software application to be developed. The SRS is provided by one or more users of the software application. In an embodiment of the invention, the SRS is provided by the business users or the clients. In an embodiment of the invention, the analysis of the SRS is performed manually by the software developer.

Development module 902 is further configured for enabling the user to develop a plurality of use cases for the SRS. In an embodiment of the invention, the user developing the plurality of use cases is a software developer or a software tester. A use case describes functional requirements of a software application. Therefore, a single use case or multiple use cases can be developed for a single SRS. In an embodiment of the invention, the use cases are identified from the SRS. The use cases are developed manually by the software developer.

Development module 902 is further configured for enabling the user to analyze the plurality of use cases for developing the use-case activity diagrams. The analysis of the use cases includes identification of a plurality of units of behavior from the multiple use cases. Each use case describes or represents a complex behavior of the software application. The analysis of the use case includes decomposition of the complex behavior described by the use cases into multiple units of behavior as explained in detail in conjunction with FIG. 2. In an embodiment of the invention, the units of behavior are identified from the plurality of use cases based on a predefined set of rules. The predefined set of rules is based on slicing of the behavior described in the use cases.

Consistency checking module 904 is configured to check the consistency of the use-case activity diagrams developed by development module 902. The consistency check of the use-activity diagram includes checking whether the predefined set of rules is followed or not during the development of the use-case activity diagrams. The consistency check of the use-case activity diagrams has been explained in detail in conjunction with FIG. 1 and FIG. 3. The consistency check of the use-case activity diagrams is performed automatically by consistency checking module 904 without any manual intervention.

First updating module 906 is configured for enabling the user to update the use-case activity diagrams based on the consistency check performed by consistency checking module 904. If consistency checking module 904 determines that a use-case activity diagram is inconsistent, then the particular use-case activity diagram is updated by first updating module 906, in order to make it consistent with the predefined set of rules.

Validation module 908 is configured for enabling the user to validate the consistent use-case activity diagrams with one or more users. Further, the use-case activity diagrams updated by first updating module 906 are validated with one or more users. In an embodiment of the invention, the use-case activity diagrams are validated with the business users or the clients. The validation of the use-case activity diagrams includes checking whether the entire business functionality of the software application is covered or not. The validation of the use-case activity diagrams has been explained in detail in conjunction with FIG. 1.

Second updating module 910 is configured for enabling the user to update the validated use-case activity diagrams based on one or more requirements of the users. The use-case activity diagram is updated by adding one or more units of behavior in the use-case activity diagram, as explained in conjunction with FIG. 1.

Identification module 912 is configured for enabling the user to identify the criticality of each of the multiple units of behavior in the use-case activity diagram. In an embodiment of the invention, the units of behavior are marked as highly critical, moderately critical or lowly critical by the user in the corresponding use-case activity diagram, as explained in conjunction with FIG. 1.

Linking module 914 is configured for linking a plurality of use-case activity diagrams for one or more software applications. The linking of the use-case activity diagrams facilitates the reusability of the use-case activity diagrams. The linking of the use-case activity diagrams has been explained in detail in conjunction with FIG. 1, FIG. 8(a) and FIG. 8(b). Linking module 914 links the use-case activity diagrams on the basis of the inputs provided by the user.

Test case generation module 916 is configured for generating one or more functional test cases from the validated use-case activity diagrams. Further, the functional test cases are generated from the use-case activity diagrams updated by second updating module 910. Furthermore, the functional test cases are generated from the use-case activity diagrams linked by linking module 914. The functional test cases are generated automatically by test case generation module 916 without needing any manual intervention. The automatic generation of the functional test cases has been explained in detail in conjunction with FIG. 1. Further, the functional test cases have been explained in detail in conjunction with FIG. 6(a), FIG. 6(b), FIG. 6(c), and FIG. 7. In an embodiment of the invention, the functional test cases thus generated are tabulated into a Hyper Text Markup Language (HTML) page or a Microsoft® Excel sheet or an Extended Markup Language (XML) document or a plain text (TXT) document.

Prioritization module 918 is configured for prioritizing the functional test cases generated by test case generation module 916. The functional test cases are prioritized on the basis of the criticality of the units of behavior corresponding to the functional test cases. The prioritization of the functional test cases has been explained in conjunction with FIG. 1.

In an exemplary embodiment of the invention, the assignee of the present application, Infosys Corporation, has implemented system 900 as a software tool developed using JAVA as a programming language. The tool is configured for generating the functional test cases from the structured use-case activity diagrams developed using the Unified Modeling Language (UML). The tool takes use-case activity diagrams as input from three sources-task flow diagrams developed using Influx© by the same assignee, Infosys Corporation; activity diagrams developed using IBM® Rational Rose; and activity diagrams developed using Microsoft® Visio®. Further, the tool produces the functional test cases in a format such as a Hyper Text Markup Language (HTML) format, an Extended Markup Language (XML) format, a text (TXT) format, and a Microsoft® Excel format. The output format thus generated by the tool complies with various test management tools, such as Mercury Quality Control, so that the test cases that are generated using the tool can be easily loaded in different test management tools environment.

The tool extracts the metadata from activity diagrams or use-case activity diagrams. The metadata extracted includes information, for example, identification number (ID), description, transition information of activity diagrams such as user input, decision, process and output from the input. The activity diagrams are inserted as input into the tool in formats such as XML Meta data Interchange (XMI) in Influx© task flow diagrams, Petal file (PTL) in Rational Rose, and Extended Markup Language (XML) in Microsoft® Visio®. The metadata thus extracted from the activity diagrams is in the form of XMI. The data is then validated using XML schema for its correctness and completeness. The required node information is extracted by parsing the validated XML using a Document Object Model (DOM) parser. A graph is constructed using the information of nodes extracted from XML. The graph is then used to generate paths by the tool. The paths are generated from the graph using one or more exemplary algorithms listed in conjunction with FIG. 1. The algorithms perform a depth-first search on the graph and generate the set of paths. The generated paths are then used by the tool to generate test cases or test scenarios, as explained in conjunction with FIG. 1. As explained in conjunction with FIG. 1, each path from the start node (or initial node) to the stop node (or end node) is generated as a single test case with each unit of behavior in the path generated as a single test step. Further, the tool formats the generated test cases in the formats such as HTML, text, Microsoft® Excel and XML. The format of the test cases is selected by the user. It will be evident to a person skilled in the art that the format of the test cases is selected by the business users or the clients.

The method, system and computer program product described above have various advantages. The method provides a systematic approach for structuring use-case activity diagrams. The structured use-case activity diagrams are useful in automatic generation of test cases as well as other activities of a software development life cycle such as design of software applications, and so forth. The structured use-case activity diagrams also assist in identifying ambiguities and incompleteness of the SRS at an early stage of the software development life cycle. Further, the method provides a systematic approach for generation of functional test cases for system testing which thereby provides a complete coverage of test cases for revealing errors present in the software. Furthermore, the method provides an efficient and easy method for creation and maintenance of functional test cases, thereby saving cost and time spent. Further, the functional test cases generated by the method are easy to maintain as compared to the functional test cases developed and maintained based on text and Microsoft® Excel.

The system for generating functional test cases for testing a software application, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for generating functional test cases for testing a software application. The computer program product includes a computer usable medium having a set of program instructions comprising a program code for generating functional test cases for testing a software application. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The invention claimed is:

1. A method for developing one or more functional test cases used for testing a software application, the method comprising:

developing one or more use-case activity diagrams for the software application, the development being based on a predefined set of rules, each of the one or more use-case activity diagrams comprising an ordered sequence of a plurality of units of behavior, wherein the each of the one or more use-case activity diagrams is updated by adding one or more units of behavior and correcting error(s) in the use-case activity diagrams, wherein the each of the one or more units of behavior is classified based on the criticality of the particular unit of behavior, and includes an indivisible logical unit of an input, processing of the input and an output based on the processing of the input, and a set of conditions; and wherein the predefined set of rules is based on slicing of the behavior of the plurality of use-cases, the behavior being sliced into the plurality of the units of behavior;

automatically checking consistency of the one or more use-case activity diagrams, if the one or more use-case activity diagrams are identified as inconsistent, it is updated with the predefined set of rules in order to make it consistent;

validating the consistent use-case activity diagrams with one or more users;

automatically generating the one or more functional test cases from the validated use-case activity diagrams, wherein the automatic generation of the one or more functional test cases include a use of a test case generation algorithm, wherein the one or more functional test cases are synchronized with the execution of other functional test cases, and prioritized on the basis of criticality of the units of behavior; and linking a plurality of use-case activity diagrams for one or more software applications, wherein the linking facilitates reusability of the plurality of use-case activity diagrams, wherein the use-case activity diagrams generated for a software application can be linked to the one or more use-case activity diagrams of the same or different software application.

2. The method of claim 1, wherein developing the one or more use-case activity diagrams comprises:

a. analyzing a Software Requirement Specifications (SRS) for the software application, the SRS being provided by the one or more users;

b. developing a plurality of use-cases for the SRS; and c. analyzing the plurality of use-cases for developing the one or more use-case activity diagrams, wherein analyzing the plurality of use-cases comprises identifying the plurality of units of behavior from the plurality of use-cases.

3. The method of claim 2, wherein the each of the one or more use-case activity diagrams represents a behavior of at least one of the plurality of use-cases.

4. The method of claim 1, wherein the one or more use-case activity diagrams are developed by a software developer.

5. The method of claim 1, wherein the each of the one or more use-case activity diagrams is defined in Unified Modeling Language (UML).

6. The method of claim 1, wherein the one or more functional test cases are generated from the linked use-case activity diagrams.

7. The method of claim 1 further comprising updating the validated use-case activity diagrams based on one or more requirements of the one or more users.

8. The method of claim 1, wherein the one or more functional test cases are generated from the updated use-case activity diagrams.

9. A system for developing one or more functional test cases used for testing a software application, the system comprising:

a development module configured for enabling at least one user for developing one or more use-case activity diagrams for the software application, the development being based on a predefined set of rules, each of the one or more use-case activity diagrams comprising an ordered sequence of a plurality of units of behavior, wherein the each of the one or more use-case activity diagrams is updated by adding one or more units of behavior and correcting error(s) in the use-case activity diagrams, wherein the each of the one or more units of behavior is classified based on the criticality of the particular unit of behavior, and includes an indivisible logical unit of an input, processing of the input and an output based on the processing of the input, and a set of conditions; and wherein the predefined set of rules is based on slicing of the behavior of the plurality of use-cases, the behavior being sliced into the plurality of the units of behavior;

a consistency checking module configured for automatically checking consistency of the one or more use-case activity diagrams, if the one or more use-case activity diagrams are identified as inconsistent, it is updated with the predefined set of rules in order to make it consistent;

a validation module configured for enabling the at least one user for validating the consistent use-case activity diagrams with one or more users;

a test case generation module configured for automatically generating the one or more functional test cases from the validated use-case activity diagrams, wherein the automatic generation of the one or more functional test cases include a use of a test case generation algorithm, wherein the one or more functional test cases are synchronized with the execution of other functional test cases, and prioritized on the basis of criticality of the units of behavior; and linking a plurality of use-case activity diagrams for one or more software applications, wherein the linking facilitates reusability of the plurality of use-case activity diagrams, wherein the use-case activity diagrams generated for a software application can be linked to the one or more use-case activity diagrams of the same or different software application.

10. The system of claim 9, wherein the development module is further configured for enabling the at least one user for:
a. analyzing a Software Requirement Specifications (SRS) for the software application, the SRS being provided by the one or more users;
b. developing a plurality of use-cases for the SRS; and
c. analyzing the plurality of use-cases for developing the one or more use-case activity diagrams, wherein analyzing the plurality of use-cases comprises identifying the plurality of units of behavior from the plurality of use-cases.

11. The system of claim 10, wherein the each of the one or more use-case activity diagrams represents a behavior of at least one of the plurality of use-cases.

12. The system of claim 9, wherein the one or more use-case activity diagrams are developed by a software developer.

13. The system of claim 9, wherein the each of the one or more use-case activity diagrams is defined in Unified Modeling Language (UML).

14. The system of claim 9, wherein the one or more functional test cases are generated from the linked use-case activity diagrams.

15. The system of claim 9 further comprising a second updating module configured for enabling the at least one user for updating the validated use-case activity diagrams based on one or more requirements of the one or more users.

16. The system of claim 9, wherein the one or more functional test cases are generated from the updated use-case activity diagrams.

17. A computer program product for use with a computer, the computer program product comprising a non-transitory computer usable medium having a computer readable program code embodied therein for developing one or more functional test cases used for testing a software application, the computer readable program code performing:

developing one or more use-case activity diagrams for the software application, the development being based on a predefined set of rules, each of the one or more use-case activity diagrams comprising an ordered sequence of a plurality of units of behavior, wherein the each of the one or more use-case activity diagrams is updated by adding one or more units of behavior and correcting error(s) in the use-case activity diagrams, wherein the each of the one or more units of behavior is classified based on the criticality of the particular unit of behavior, and includes an indivisible logical unit of an input, processing of the input and an output based on the processing of the input, and a set of conditions; and wherein the predefined set of rules is based on slicing of the behavior of the plurality of use-cases, the behavior being sliced into the plurality of the units of behavior;

automatically checking consistency of the one or more use-case activity diagrams, if the one or more use-case activity diagrams are identified as inconsistent, it is updated with the predefined set of rules in order to make it consistent;

validating the consistent use-case activity diagrams with one or more users;

automatically generating the one or more functional test cases from the validated use-case activity diagrams, wherein the automatic generation of the one or more functional test cases include a use of a test case generation algorithm, wherein the one or more functional test cases are synchronized with the execution of other functional test cases, and prioritized on the basis of criticality of the units of behavior; and linking a plurality of use-case activity diagrams for one or more software applications, wherein the linking facilitates reusability of the plurality of use-case activity diagrams, wherein the use-case activity diagrams generated for a software application can be linked to the one or more use-case activity diagrams of the same or different software application.

18. The computer program product of claim 17, wherein the computer readable program code further performs updating the validated use-case activity diagrams based on one or more requirements of the one or more users.

* * * * *